(No Model.)

G. A. STOM.
VEHICLE RUNNING GEAR.

No. 432,150. Patented July 15, 1890.

Witnesses,
Geo. H. Strong.
J. A. Nurse

Inventor,
George A. Stom
by Dewey & Co.
attys

UNITED STATES PATENT OFFICE.

GEORGE A. STOM, OF GOLDEN GATE, CALIFORNIA.

VEHICLE RUNNING-GEAR.

SPECIFICATION forming part of Letters Patent No. 432,150, dated July 15, 1890.

Application filed May 8, 1890. Serial No. 351,074. (No model.)

*To all whom it may concern:*

Be it known that I, GEORGE A. STOM, a citizen of the United States, residing at Golden Gate, Alameda county, State of California, have invented an Improvement in Vehicle Running-Gear; and I hereby declare the following to be a full, clear, and exact description of the same.

My invention relates to a novel vehicle running-gear; and it consists of a series of elastic springs connecting the front and rear axles, and so disposed as to allow the front axle to be turned without the interposition of a bolster or fifth-wheel.

Figure 1:
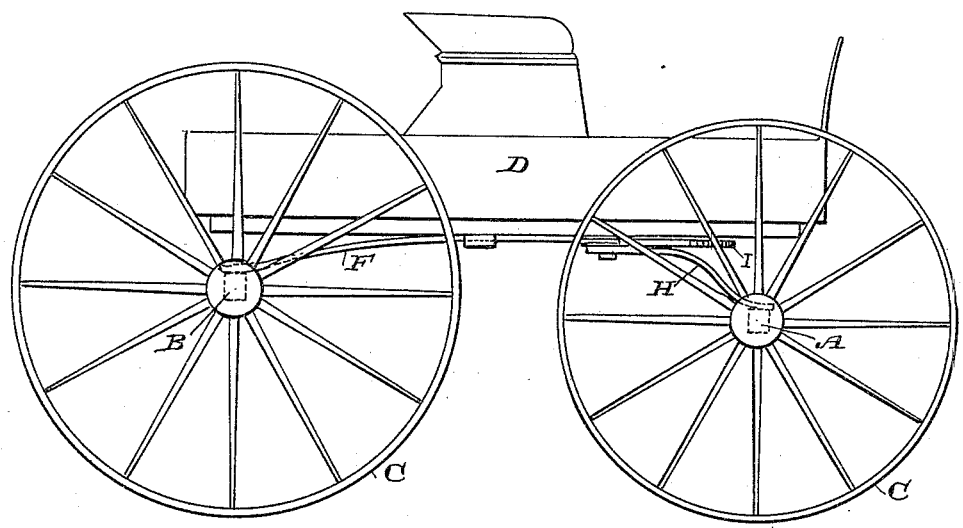
Figure 2:
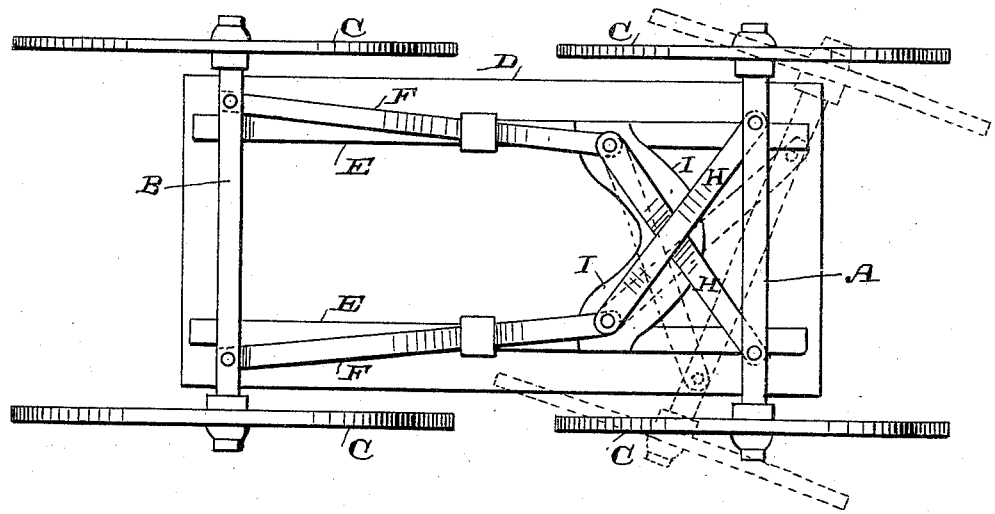

Referring to the accompanying drawings for a more complete explanation of my invention, Figure 1 is a side elevation. Fig. 2 is a bottom view showing the front axle in its normal position, and showing it turned to one side in dotted lines.

A is the front and B the rear axle, having the usual wheels C.

D is the body of the vehicle, having the floor-timbers E, which may be disposed either longitudinally or transversely.

F F are two springs, the rear ends of which are firmly secured to the rear axle, and the front portion of these springs is fixed to the timbers E at a sufficient distance from the rear axle to allow the rear ends of the springs to have as much elastic movement as may be necessary to provide sufficient elasticity to the vehicle.

H H are two springs, having their front ends pivotally connected with the front axle, these springs crossing each other, as shown, and having the rear ends pivoted to the frame-timbers of the vehicle-bed. In the present case I have shown them connected at the same point with the front ends of the rear springs.

I is a plate or surface, preferably made of steel, against which that portion of the front springs intermediate between their front and rear pivots is supported, a sufficient portion of the springs projecting beyond the front edge of the plate, so that that portion between the plate and the axle will provide sufficient elasticity for the front portion of the vehicle. This plate serves as a surface over which the springs move, and upon which they also move over each other when any change of direction of the front axle is necessitated by turning the vehicle to one side or the other.

Having thus described my invention, what I claim as new, and desire to secure by Letters Patent, is—

1. A vehicle having the front and rear axles, the rear springs fixed to the vehicle bottom or frame and projecting to the point where they are attached to the rear axle, and the front springs pivoted to the bed or frame and crossing each other, having their front ends pivoted to the front axle, substantially as herein described.

2. A vehicle having the front and rear axles, the springs fixed to the vehicle bed or frame and projecting rearwardly and having their rear ends secured to the rear axles; the front springs pivoted to the vehicle bed or frame at their junction with the rear springs crossing each other and having their front ends pivoted to the front axle, and the wear-plate upon which that portion of the springs intermediate between their pivotal points cross each other, substantially as herein described.

In witness whereof I have hereunto set my hand.

GEORGE A. STOM.

Witnesses:
GEO. H. STRONG,
S. H. NOURSE.